J. M. Smith,
Hollow Auger,

N° 55,382.   Patented June 5, 1866.

Witnesses:
M. A. Hine
John H. Shumway

Inventor:
J. M. Smith
By his atty
John E. Earle

UNITED STATES PATENT OFFICE.

JAMES M. SMITH, OF SEYMOUR, CONNECTICUT.

IMPROVEMENT IN HOLLOW AUGERS.

Specification forming part of Letters Patent No. 55,382, dated June 5, 1866.

*To all whom it may concern:*

Be it known that I, JAMES M. SMITH, of Seymour, in the county of New Haven and State of Connecticut, have invented a new Improvement in Hollow Augers; and I do hereby declare the following, when taken in connection with the accompanying drawings and the letters of reference marked thereon, to be a full, clear, and exact description of the same, and which said drawings constitute part of this specification, and represent, in—

Figure 1:
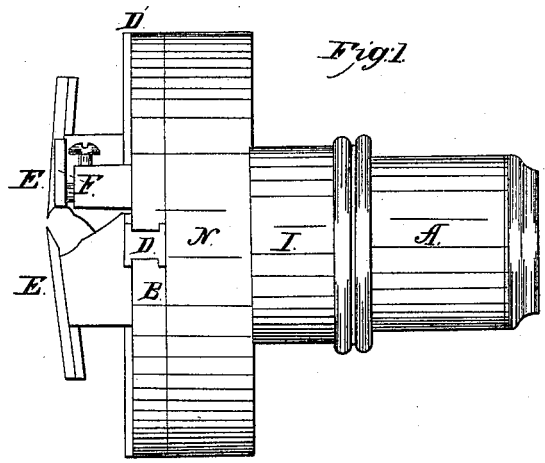
Figure 2:
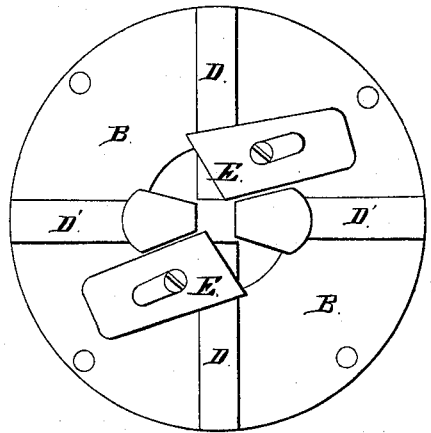
Figure 3:
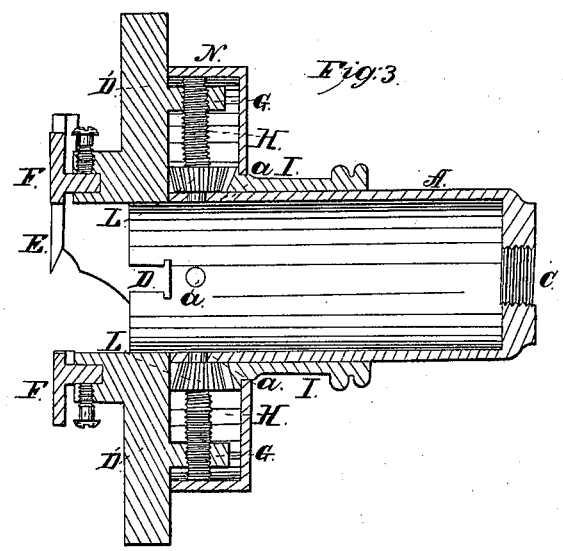
Figure 4:
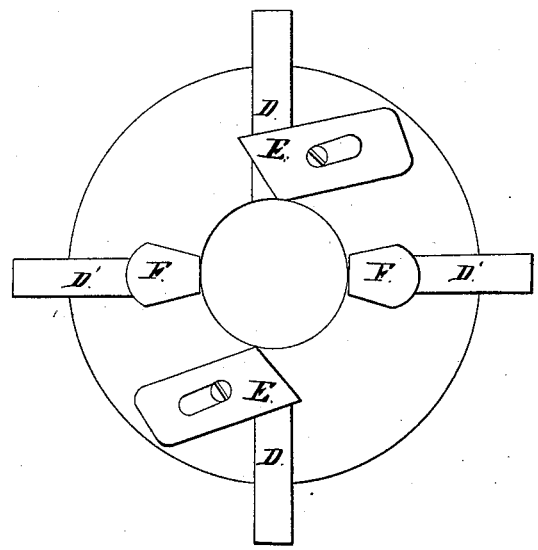

Figure 1, a side view; Fig. 2, a face view, the cutter and guides closed to cut their smallest diameter; Fig. 3, a longitudinal central section; and in Fig. 4, a face view, showing the cutters and guides extended to cut their largest diameter.

My invention relates to an improvement in the construction of an adjustable hollow auger, so that the adjustment of the cutters and guides are made at the same time and without disturbing the relative position of the cutters or guides.

To enable others skilled in the art to construct and use my improvement, I will proceed to describe the same as illustrated in the accompanying drawings.

A is a hollow shank fitted to a head, B, and attached to the driving-shaft at the end C. In the head B are formed four radial grooves, into which are fitted slides D and D'. To the said slides D are fixed cutters E, and to the slides D' guides F.

On the rear of the slides D is formed a lug, G, in which works a screw, H, having a bearing on the shank A at $a$, (see Fig. 3,) and around the said shank is a cylinder, I, provided with a toothed edge, which works in toothed wheels L on the screws H, so that as the cylinder I is turned upon the shank to the right or left the screws will be turned accordingly and draw the slides D, with their cutters or guides, to or from the center, as the case may be. The screws and wheels are covered by a cap, N.

To use my invention, set the guides at equal distances from the center, and the cutters in the same position, the edge of the cutters lying a little beyond the guides, as seen in Fig. 1—that is to say, as much as is desired for the thickness of the cut; then turn the cylinder I until the cutters and guides are set to the required diameter, and the auger is ready for use.

By this construction the auger may be easily and quickly set or changed from one diameter to another.

I do not broadly claim an adjustable hollow auger; but,

Having thus fully described my invention, what I claim as new and useful, and desire to secure by Letters Patent, is—

The combination of the hollow shank A, cylinder I, adjusting-screws H, and slides, all constructed and arranged substantially as described, so as to adjust the cutters and guides, as and for the purpose specified.

JAMES M. SMITH.

Witnesses:
 JOHN E. EARLE,
 M. A. HINE.